Patented Oct. 3, 1922.

1,430,551

UNITED STATES PATENT OFFICE.

CLARENCE J. HERRLY, OF PITTSBURGH, PENNSYLVANIA, ASSIGNOR TO UNION CARBIDE COMPANY, A CORPORATION OF VIRGINIA.

METHOD OF OXIDIZING FERROUS SULPHATE.

No Drawing. Application filed July 13, 1920. Serial No. 395,929.

*To all whom it may concern:*

Be it known that I, CLARENCE J. HERRLY, a citizen of the United States, residing at Pittsburgh, in the county of Allegheny and State of Pennsylvania, have invented certain new and useful Improvements in Methods of Oxidizing Ferrous Sulphate, of which the following is a specfication.

This invention is a novel method of oxidizing ferrous sulphate, in aqueous solution or suspension, to ferric sulphate; the method being applicable also to the regeneration by re-oxidation of ferric sulphate solutions which have undergone partial or complete reduction in the course of their employment in connection with oxidizing reactions, such for example as the prevention of the formation of metallic mercury in the preparation of acetaldehyde from acetylene, etc.

Ferrous sulphate crystals (copperas) as is well known undergo slow oxidation upon exposure to air, and acid solutions of ferrous sulphate may be slowly and partially oxidized by injection of air or oxygen. The oxidation under such conditions is however far too slow and incomplete to be applicable to commercial processes of the nature above indicated; and neither in respect to speed or completeness of reaction does pure oxygen show any marked advantage over atmospheric air.

I have discovered that ferrous sulphate in solution or suspension in acid solutions may be oxidized very quickly and efficiently by free oxygen, when the latter is employed in conjunction with a suitable catalyst, which is preferably also a gas. My preferred catalysts are the oxids of nitrogen, or substances capable of giving rise to oxids of nitrogen.

In the practice of my invention in its preferred embodiment, the ferrous sulphate crystals, together with an amount of sulfuric acid sufficient at least to supply the additional $SO_4$ radicals required by the reaction are suspended or dissolved in water, through which there is then passed an excess of oxygen, together with a relatively small proportion of nitric oxid. The absorption of oxygen takes place rapidly; and by operating in a closed system the nitric oxid which escapes from the solution may be mixed with additional oxygen and again bubbled through the solution, the process being continued until all or any desired proportion of the ferrous sulphate has been oxidized to ferric sulphate, in accordance with the following typical equation:

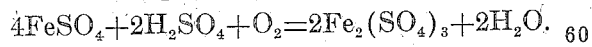
$$4FeSO_4 + 2H_2SO_4 + O_2 = 2Fe_2(SO_4)_3 + 2H_2O.$$

Following are certain specific examples in accordance with my invention, it being understood that the invention is not restricted to the particular operating conditions therein set forth:

Example I.

Two kilograms of copperas ($FeSO_4.7H_2O$) are dissolved in water and 705 grams of sulfuric acid added. While agitating vigorously, some 50 grams of nitric acid are introduced into the solution and the oxygen addition begun. A closed system being employed, the nitric oxid escaping from the solution is led to a suitable receptacle in which it is mixed with a constant supply of oxygen, and the mixture returned to the solution, thus providing a continuous circulation of the gas mixture. The oxygen is vigorously absorbed, the temperature of the solution rising by reason of the exothermic nature of the reaction. The reaction may be carried out either at normal or higher temperatures The addition of oxygen may be continued until all of the ferrous sulphate has been oxidized to ferric sulphate, when aproximately 115 grams of oxygen will have been absorbed. Air or other gas is then blown through the oxidized solution to remove the last traces of the gaseous catalyst.

Example II.

Five kilograms of a partly reduced ferric sulphate solution, which has been separated from the mercury sludge derived from the acetaldehyde operation mentioned above, are treated with a mixture of oxygen and nitric oxid (the latter conveniently generated from a small addition of nitric acid) while agitating. The nitric oxid escaping from the solution is led to a suitable receptacle (a closed system being employed) where it is mixed with a further supply of oxygen and returned to the solution, thus providing a continuous closed cycle to which oxygen may be added until all of the ferrous sulphate has been completely oxidized to ferric sulphate.

Whenever the operation is performed in a closed cycle the oxygen is preferably added in substantially undiluted form, whereby the volume of the circulating gases may be kept substantially constant.

In case an excess of sulfuric acid is present in a wholly or partly reduced ferric sulphate solution, such excess may be reduced to the normal or theoretical amount by the addition of scrap iron to form more ferrous sulphate; or copperas may be added in sufficient proportion to react with the excess of sulfuric acid during the subsequent oxidation, so as finally to obtain a solution of ferric sulphate containing no excess, or only the desired excess, of sulfuric acid.

Substances capable of generating oxids of nitrogen are obviously to be regarded as equivalents of free nitric oxid for the purposes of this invention.

I claim:—

1. A method of oxidizing ferrous sulphate, comprising subjecting the same, in presence of water and sufficient sulfuric acid, to the conjoint action of free oxygen and a catalyst comprising an oxid of nitrogen.

2. Method according to claim 1, wherein the gases are circulated repeatedly in contact with the ferrous sulphate, additional oxygen being supplied to the system according to the reaction requirements.

3. Method according to claim 1, wherein the ferrous sulphate, in solid phase, is suspended in the acid solution.

In testimony whereof, I affix my signature.

CLARENCE J. HERRLY.